(12) United States Patent
Matsukuma et al.

(10) Patent No.: US 10,655,505 B2
(45) Date of Patent: May 19, 2020

(54) COMPRESSED AIR ENERGY STORAGE AND POWER GENERATION DEVICE AND COMPRESSED AIR ENERGY STORAGE AND POWER GENERATION METHOD

(71) Applicant: Kabushiki Kaisha Kobe Seiko Sho (Kobe Steel, Ltd.), Hyogo (JP)

(72) Inventors: Masaki Matsukuma, Hyogo (JP); Hiroki Saruta, Takasago (JP); Kanami Sakamoto, Takasago (JP)

(73) Assignee: Kabushiki Kaisha Kobe Seiko Sho (Kobe Steel, Ltd.), Hyogo (JP)

( * ) Notice: Subject to any disclaimer, the term of this patent is extended or adjusted under 35 U.S.C. 154(b) by 95 days.

(21) Appl. No.: 15/571,672

(22) PCT Filed: Apr. 27, 2016

(86) PCT No.: PCT/JP2016/063198
§ 371 (c)(1),
(2) Date: Nov. 3, 2017

(87) PCT Pub. No.: WO2016/181841
PCT Pub. Date: Nov. 17, 2016

(65) Prior Publication Data
US 2019/0170026 A1    Jun. 6, 2019

(30) Foreign Application Priority Data

May 8, 2015    (JP) .................................. 2015-095390

(51) Int. Cl.
*F01K 27/00*    (2006.01)
*F01K 3/12*    (2006.01)
(Continued)

(52) U.S. Cl.
CPC ................ *F01K 27/00* (2013.01); *F01K 3/02* (2013.01); *F01K 3/12* (2013.01); *F01K 27/02* (2013.01);
(Continued)

(58) Field of Classification Search
CPC ......... Y02E 60/15; Y02E 60/14; Y02E 70/30; Y02E 10/566; Y02E 10/766; F02C 6/16;
(Continued)

(56) References Cited

U.S. PATENT DOCUMENTS

| 8,893,486 B2 | 11/2014 | Fong et al. |
| 2010/0251712 A1 | 10/2010 | Nakhamkin |

(Continued)

FOREIGN PATENT DOCUMENTS

| JP | 2012-097737 A | 5/2012 |
| JP | 2013-512410 A | 4/2013 |

(Continued)

OTHER PUBLICATIONS

The extended European search report issued by the European Patent Office dated Nov. 21, 2018, which corresponds to EP16792566.8-1008 and is related to U.S. Appl. No. 15/571,672.
(Continued)

*Primary Examiner* — Mark A Laurenzi
*Assistant Examiner* — Xiaoting Hu
(74) *Attorney, Agent, or Firm* — Studebaker & Brackett PC

(57) ABSTRACT

A compressor compresses air in such a manner that a motor is driven by renewable energy. An accumulator tank stores the air thus compressed. An expander is driven by the compressed air. A generator is mechanically connected to the expander. A first heat exchanger recovers compressed heat. A heat medium tank that stores a heat medium. A second heat exchanger that heats the compressed air. A first
(Continued)

pump adjusts an amount of the heat medium to be supplied to the first heat exchanger. A control device controls the first pump to adjust the amount of heat medium to be supplied to the first heat exchanger so as to maintain the heat medium, which is stored in the heat medium tank, at a predetermined first temperature.

14 Claims, 3 Drawing Sheets

(51) Int. Cl.
- F28D 20/00 (2006.01)
- F02C 1/04 (2006.01)
- F02C 6/16 (2006.01)
- F02C 1/05 (2006.01)
- H02J 15/00 (2006.01)
- F01K 3/02 (2006.01)
- F01K 27/02 (2006.01)

(52) U.S. Cl.
CPC .............. F02C 1/04 (2013.01); F02C 1/05 (2013.01); F02C 6/16 (2013.01); F28D 20/00 (2013.01); H02J 15/00 (2013.01); H02J 15/006 (2013.01); F05D 2220/76 (2013.01); F05D 2260/213 (2013.01); Y02E 60/142 (2013.01); Y02E 60/15 (2013.01)

(58) Field of Classification Search
CPC ........ F03D 9/17; F03D 9/18; F24J 2/34; F24J 2/345; H02S 40/38; F28D 20/0034; H02J 15/00; F01K 3/02; F01K 27/00; F05D 2260/213; F05D 2220/76
See application file for complete search history.

(56) References Cited

U.S. PATENT DOCUMENTS

| | | |
|---|---|---|
| 2011/0127004 A1 | 6/2011 | Freund et al. |
| 2012/0036853 A1 | 2/2012 | Kidd et al. |
| 2012/0102937 A1 | 5/2012 | Anikhindi et al. |
| 2013/0061591 A1 | 3/2013 | Bove et al. |
| 2013/0192216 A1* | 8/2013 | Berlin, Jr. ................ F02C 6/16 60/327 |
| 2015/0260463 A1* | 9/2015 | Laughlin .................. F02C 1/10 165/10 |

FOREIGN PATENT DOCUMENTS

| | | | |
|---|---|---|---|
| JP | 2013-536357 A | 9/2013 | |
| WO | WO-2010125568 A2 * | 11/2010 | ............... F03D 9/17 |
| WO | 2014/052927 A1 | 4/2014 | |

OTHER PUBLICATIONS

International Search Report issued in PCT/JP2016/063198; dated Jul. 12, 2016.

* cited by examiner

COMPRESSED AIR ENERGY STORAGE AND POWER GENERATION DEVICE AND COMPRESSED AIR ENERGY STORAGE AND POWER GENERATION METHOD

CROSS-REFERENCE TO RELATED APPLICATIONS

This is a national phase application in the United States of International Patent Application No. PCT/JP2016/063198 with an international filing date of Apr. 27, 2016, which claims priority of Japanese Patent Application No. 2015-095390 filed on May 8, 2015 the contents of which are incorporated herein by reference.

TECHNICAL FIELD

The present invention relates to a compressed air energy storage and power generation device and a compressed air energy storage and power generation method.

BACKGROUND ART

In power generation using solar energy, such as solar power generation and solar thermal power generation, a power generation output thereof is affected by conditions of sunshine of that day, and fluctuates to a large extent. For example, the power generation cannot be performed at night, and the power generation output largely decreases on rainy and cloudy days. Moreover, depending on the conditions of sunshine from dawn to sunset as well as the conditions of sunshine such as "clear and then cloudy", the power generation output largely fluctuates within a day.

Moreover, in wind power generation using wind turbines, a power generation output thereof largely fluctuates due to changes in a wind direction and a wind force on that day. In such a power generation facility such as a wind farm in which a plurality of wind turbines are gathered, the power generation outputs of the respective wind turbines are added to one another, whereby short-cycle fluctuations of the power generation can be smoothed; however, the fluctuations of the power generation output thereof cannot be avoided when the power generation output is viewed as a whole.

As a technology for smoothing or leveling such a fluctuating and unstable power generation output as described above, typical is a storage battery that stores electricity when surplus generated power occurs and makes up deficit electricity when power is insufficient; however, there is known a technology called compressed air energy storage (CAES) for storing surplus generated power as an air pressure converted as an alternative of electricity when such surplus generated power occurs and then reconverting the air pressure into the electricity by an air turbine generator and the like when necessary. In general, the case of smoothing fluctuations of a relatively short cycle is called smoothing, and the case of smoothing fluctuations of a relatively long cycle is called leveling; however, here, both are collectively referred to as smoothing.

Typical conventional technologies using this CAES technology are disclosed in JP 2012-97737 A, JP 2013-512410 A, and JP 2013-536357 A. In JP 2012-97737 A, JP 2013-512410 A, and JP 2013-536357 A, energy storage efficiency is enhanced by recovering heat generated in a compression step by a compressor.

SUMMARY OF THE INVENTION

Problems to be Solved by the Invention

However, any of the conventional technologies is premised that the compressed air is stored in a large storage space such as an underground cave by using unnecessary power at an off-peak time (this power does not largely fluctuate like power generated by renewable energy). Hence, any of the conventional technologies does not have an object to smooth the fluctuating power like the power generation using such renewable energy as sunlight and wind force.

Moreover, any of the conventional technologies does not disclose the fact that, when the power to be absorbed by the compressor changes frequently, an amount of such absorbed power is changed by varying dynamic power to drive the compressor. Moreover, needless to say, means for preventing a heat recovery temperature from fluctuating due to a change of an operation state of the compressor is not disclosed at all.

In a CAES power generation device, it is extremely important to reduce an energy loss in a charging step and a discharging step as much as possible (to increase charge/discharge efficiency). Hence, in usual, a variety of parameters such as a temperature condition related to the heat recovery are determined to optimum values so that the charge/discharge efficiency of the whole of a system can be maximized. When the power to be absorbed does not fluctuate very much, the compressor can be operated at stable discharge pressure and discharge temperature. However, when it is premised that the power to be absorbed fluctuates largely as in the smoothing of the power generation output by the renewable energy, then the discharge pressure, the discharge temperature and the like are changed. Therefore, such an operation under constant parameters cannot be maintained, and the charge/discharge efficiency of the whole of the system decreases.

It is an object of the present invention to provide a compressed air energy storage and power generation device and a compressed air energy storage and power generation method, which can highly maintain the charge/discharge efficiency of the compressed air energy storage and power generation device in the case of using the compressed air energy storage and power generation device for smoothing the renewable energy in which the power to be absorbed fluctuates.

Means for Solving the Problems

A first aspect of the present invention provides a compressed air energy storage and power generation device including: an electric motor driven by fluctuating input power; a compressor that is mechanically connected to the electric motor and compresses air; an accumulator tank that is fluidly connected to the compressor and stores the air compressed by the compressor; an expander that is fluidly connected to the accumulator tank and is driven by the compressed air supplied from the accumulator tank; a generator that is mechanically connected to the expander; a first heat exchanger for heating a heat medium by performing heat exchange between the heat medium and the air compressed by the compressor; a heat medium tank that is fluidly connected to the first heat exchanger and stores the heat medium; a second heat exchanger that is fluidly connected to the heat medium tank and serves for heating the compressed air by performing heat exchange between the heat medium supplied from the heat medium tank and the compressed air supplied to the expander; first flow rate adjusting means for adjusting an amount of the heat medium supplied to the first heat exchanger; and a control device that adjusts an amount of the heat medium supplied to the first heat exchanger by the first flow rate adjusting means so as to maintain the heat medium stored in the heat medium tank at a predetermined first temperature.

With this configuration, the heat medium stored in the heat medium tank by the first flow rate adjusting means is maintained at the predetermined first temperature, whereby the charge/discharge efficiency can be highly maintained in the case of using the compressed air energy storage and power generation device for smoothing the renewable energy in which the power to be absorbed fluctuates. As a specific cause of a decrease of the charge/discharge efficiency, when an amount of the power absorbed by the compressor is changed, an amount of heat of the compressed air discharged from the compressor is changed. For example, when a discharge pressure and a discharge temperature are made constant, and the amount of power absorbed by the compressor is increased, then a flow rate of the compressed air thus discharged is increased. Hence, if the flow rate of the heat medium that exchanges heat in the first heat exchanger is made constant, a temperature of the heat medium flowing into the heat medium tank rises. In this case, the temperature of the heat medium becomes higher than the set heat storage temperature set so as to be capable of maximizing the charge/discharge efficiency of the whole of the system, and the charge/discharge efficiency decreases. Meanwhile, when the amount of power absorbed by the compressor is reduced, the temperature of the heat medium falls below the set heat storage temperature, and the charge/discharge efficiency is also decreased in this case.

It is preferable that, so as to maintain the heat medium flowing into the first heat exchanger at the first temperature, the control device control a flow rate of the heat medium, which flows into the first heat exchanger, by the first flow rate adjusting means based on a change of an amount of power to be driven by the electric motor.

In this way, the heat medium can be stored in the heat medium tank at a set heat storage temperature (first temperature) set so that the charge/discharge efficiency of the whole of the system can be maximized, and accordingly, the charge/discharge efficiency of the whole of the system can be enhanced. Moreover, there is a considerable time delay until a change appears in the temperature of the heat medium flowing out from the first heat exchanger; however, the flow rate of the heat medium is controlled in response to the change of the amount of power to be absorbed by the compressor, whereby an appropriate flow rate of the heat medium can be set before the change appears in the temperature of the heat medium, and accordingly, the charge/discharge efficiency can be further enhanced.

It is preferable that the compressed air energy storage and power generation device further include second flow rate adjusting means for adjusting an amount of the heat medium supplied to the second heat exchanger. Moreover, it is preferable that, so as to maintain the compressed air supplied to the expander at a predetermined second temperature, the control device adjust an amount of the heat medium, which is supplied to the second heat exchanger, by the second flow rate adjusting means.

In this way, also on such a power supply side in addition to the power absorption side, the expander can generate power at the set power generation temperature (second temperature) set so as to be capable of maximizing the charge/discharge efficiency of the whole of the system, and accordingly, the charge/discharge efficiency can be further enhanced.

It is preferable that, so as to maintain the compressed air flowing into the expander at the second temperature, the control device control a flow rate of the heat medium, which flows into the second heat exchanger, by the second flow rate adjusting means based on a change of an amount of power to be generated by the generator.

In this way, the compressed air can be supplied to the expander at the set power generation temperature set so that the charge/discharge efficiency of the whole of the system can be maximized, and accordingly, the charge/discharge efficiency of the whole of the system can be enhanced. Moreover, there is a considerable time delay until a change appears in the temperature of the compressed air to be supplied to the expander; however, the flow rate of the heat medium is controlled in response to the change of the amount of power to be generated by the generator, whereby an appropriate flow rate of the heat medium can be set before the change appears in the temperature of the compressed air, and the charge/discharge efficiency can be further enhanced.

It is preferable that the compressed air energy storage and power generation device further include: a heat medium return tank that is fluidly connected to the first heat exchanger and the second heat exchanger and stores the heat medium whose temperature has fallen by the second heat exchanger; and a heat medium cooler for lowering a temperature of the heat medium, which is supplied from the heat medium return tank to the first heat exchanger, to a predetermined third temperature.

In this way, the heat medium flowing into the first heat exchanger can be maintained at the predetermined third temperature by the heat medium cooler, and accordingly, the heat exchange in the first heat exchanger can be performed stably, and the charge/discharge efficiency can be enhanced.

It is preferable that the heat medium tank further include: a remaining amount sensor for measuring an amount of the stored heat medium; and third flow rate adjusting means for adjusting an amount of the heat medium supplied to the heat medium tank, and when a measured value of the remaining amount sensor tells that an amount of the heat medium storable in the heat medium tank has become a predetermined value or less, the control device reduce the amount of heat medium, which is supplied to the heat medium tank, by the third flow rate adjusting means, and raise a temperature of the stored heat medium.

In this way, the temperature of the heat medium flowing into the heat medium tank is raised more than a set heat storage temperature in a predetermined steady state, and the flow rate of the heat medium flowing into the heat medium tank is lowered, whereby a time until the heat medium tank becomes full can be extended. Furthermore, the temperature of the heat medium of the heat medium tank can be raised, and accordingly, the heat can be stored even under such circumstances where it becomes originally impossible to store the heat though the charge/discharge efficiency as a whole decreases, and therefore, at least the charge efficiency can be enhanced. Here, the third flow rate adjusting means may be the same as the first or second flow rate adjusting means.

A second aspect of the present invention provides a compressed air energy storage and power generation method including: driving an electric motor by fluctuating input power; compressing air by a compressor mechanically connected to the electric motor; storing the compressed air, which is supplied from the compressor, in an accumulator tank; driving an expander by the compressed air supplied from the accumulator tank; generating power by a generator mechanically connected to the expander; raising a temperature of the heat medium by performing heat exchange between the heat medium and the compressed air, which is compressed by the compressor, in a first heat exchanger; storing the heat medium, whose temperature has risen by the first heat exchanger, in a heat medium tank; and raising a temperature of the compressed air, which is supplied from the accumulator tank, by performing heat exchange between the heat medium, which is supplied from the heat medium tank, and the compressed air in a second heat exchanger, and supplying the compressed air, whose temperature has risen, to the expander, in which an amount of the heat medium supplied to the first heat exchanger is adjusted by first flow rate adjusting means so as to maintain the heat medium, which is stored in the heat medium tank, at a predetermined first temperature.

In the compressed air energy storage and power generation method, it is preferable that, so as to maintain the heat medium flowing into the first heat exchanger at the first temperature, a flow rate of the heat medium flowing into the first heat exchanger be adjusted by the first flow rate adjusting means based on a change of an amount of power to be driven by the electric motor.

In the compressed air energy storage and power generation method, it is preferable that, so as to maintain the compressed air flowing into the expander at a second temperature, a flow rate of the heat medium flowing into the second heat exchanger be adjusted by the second flow rate adjusting means based on the change of the amount of power to be generated by the generator.

It is preferable that the compressed air energy storage and power generation method further include: measuring an amount of the heat medium, which is stored in the heat medium tank, by a remaining amount sensor; adjusting an amount of the heat medium, which is supplied to the heat medium tank, by third flow rate adjusting means; and when a measured value of the remaining amount sensor tells that an amount of the heat medium storable in the heat medium tank has become a predetermined value or less, reducing the amount of heat medium, which is supplied to the heat medium tank, by the third flow rate adjusting means, and raising a temperature of the stored heat medium.

In accordance with the present invention, the heat medium stored in the heat medium tank by the first flow rate adjusting means is maintained at the predetermined temperature, whereby the charge/discharge efficiency can be highly maintained in the case of using the compressed air energy storage and power generation device for smoothing the renewable energy in which the power to be absorbed fluctuates.

MODE FOR CARRYING OUT THE INVENTION

Hereinafter, embodiments of the present invention will be described with reference to the accompanying drawings.

First Embodiment

Figure 1:
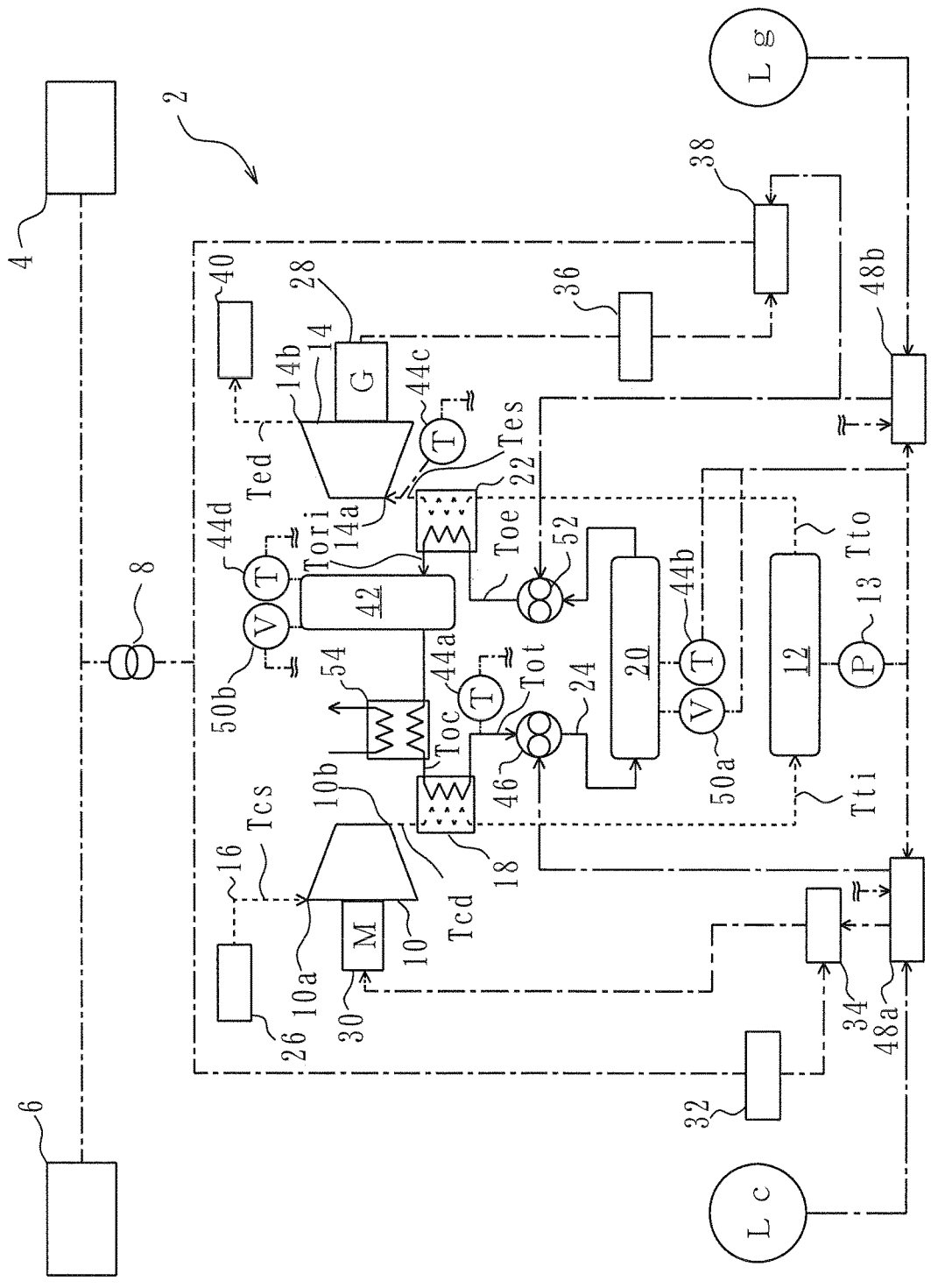
FIG. 1 is a schematic configuration diagram of a compressed air energy storage (CAES) power generation device according to a first embodiment of the present invention.

FIG. 1 shows a schematic configuration diagram of a compressed air energy storage (CAES) power generation device 2. In the case of generating power by using renewable energy, the CAES power generation device 2 of this embodiment smoothes a fluctuation of an output to a power system 4 as a demand destination, and in addition, outputs power matched with a fluctuation of demand power in the power system 4. The CAES power generation device 2 smoothes power, which is supplied from a power plant 6 by renewable energy, such as a wind power plant and a solar power plant, via a power receiving/transmitting facility 8 composed of a transformer and the like, and then outputs the power to the power system 4 as the demand destination.

Referring to FIG. 1, a description will be made of a configuration of the CAES power generation device 2.

The CAES power generation device 2 includes an air path and a heat medium path. A compressor 10, an accumulator tank 12 and an expander 14 are mainly provided in the air path, and these are fluidly connected to one another by an air pipe 16, and air flows therein (see broken lines in FIG. 1). A first heat exchanger 18, a heat medium tank 20 and a second heat exchanger 22 are mainly provided in the heat medium path, and these are fluidly connected to one another by a heat medium pipe 24, and a heat medium flows therein (see solid lines in FIG. 1).

First, the air path will be described with reference to FIG. 1. In the air path, air sucked through an intake filter 26 is compressed by the compressor 10, and is stored in the accumulator tank 12. The compressed air stored in the accumulator tank 12 is supplied to the expander 14, and is used for power generation of a generator 28.

The compressor 10 is of a screw type, and includes a motor (electric motor) 30. The motor 30 is mechanically connected to the compressor 10. Power (input power) generated by the power plant 6 is supplied to the motor 30 via a converter 32 and an inverter 34, the motor 30 is driven by this power, and the compressor 10 is activated. A discharge port 10b of the compressor 10 is fluidly connected to the accumulator tank 12 through the air pipe 16. When the compressor 10 is driven by the motor 30, the compressor 10 sucks air from a suction port 10a, compresses the sucked air, discharges the compressed air from the discharge port 10b, and sends the compressed air with pressure to the accumulator tank 12. In this embodiment, the compressor 10 is of a screw type, but may be of a turbo type or of a scroll type. Moreover, in this embodiment, the number of compressors 10 is one; however, a plurality of the compressors 10 may be installed in parallel to one another.

The accumulator tank 12 stores the compressed air sent with pressure from the compressor 10. Hence, energy can be stored as the compressed air in the accumulator tank 12. The accumulator tank 12 is fluidly connected to the expander 14 through the air pipe 16. Hence, the compressed air stored in the accumulator tank 12 is supplied to the expander 14. A storage pressure and storage capacity of the compressed air in the accumulator tank 12 are determined by an amount of the stored power. However, such a capacity of the accumulator tank 12 is generally large, and it is difficult to insulate the accumulator tank 12 from the outside air from a viewpoint of cost. Hence, a storage temperature of the compressed air in the accumulator tank 12 is set to substantially the same level as the atmospheric temperature, or a little higher or lower than the atmospheric temperature in order to avoid a heat loss due to a release into the atmosphere. A pressure sensor 13 is installed for the accumulator tank 12, and can measure a pressure of the compressed air in the inside of the accumulator tank 12.

The expander 14 is of a screw type, and includes the generator 28. The generator 28 is mechanically connected to the expander 14. The expander 14 supplied with the compressed air from a suction port 14a is activated by the compressed air thus supplied, and drives the generator 28. The generator 28 is electrically connected to the external power system 4 (see an alternate long and short dashed line in FIG. 1), and the generated power is supplied to the power system 4 as the demand destination via the converter 36 and the inverter 38. Moreover, the air expanded by the expander 14 is emitted from the discharge port 14b via an exhaust silencer 40. In this embodiment, the expander 14 is of a screw type, but may be of a turbo type or of a scroll type. Moreover, in this embodiment, the number of such expanders 14 is one; however, a plurality of the expanders 14 may be installed in parallel to one another.

Next, the heat medium path will be described with reference to FIG. 1. In the heat medium path, heat generated in the compressor 10 is recovered to the heat medium in the first heat exchanger 18. Then, the heat medium that has recovered the heat is stored in the heat medium tank 20, and in the second heat exchanger 22, the heat is returned to the compressed air before being expanded in the expander 14. The heat medium whose temperature has fallen by such a heat exchange in the second heat exchanger 22 is supplied to a heat medium return tank 42. Then, the heat medium is supplied from the heat medium return tank 42 to the first heat exchanger 18 one more time, and the heat medium circulates in this way. Here, a type of the heat medium is not particularly limited, and for example, mineral oil-based or glycol-based heat medium can be used, and a service temperature thereof is approximately 150° C. to 240° C.

The first heat exchanger 18 is provided in the air pipe 16 between the compressor 10 and the accumulator tank 12. Hence, the heat exchange is performed between the compressed air in the air pipe 16 and the heat medium in the heat medium pipe 24, and compressed heat generated by the compression by the compressor 10 is recovered to the heat medium. That is, in the first heat exchanger 18, a temperature of the compressed air falls, and such a temperature of the heat medium rises. Here, the heat medium whose temperature has risen is supplied to the heat medium tank 20 through the heat medium pipe 24.

In the heat medium pipe 24 from the first heat exchanger 18 to the heat medium tank 20, there are provided: a temperature sensor 44a for measuring a temperature of the heat medium whose temperature has risen by performing the heat exchange in the first heat exchanger 18; and a first pump (first flow rate adjusting means) 46 for making the heat medium flow. A type of the first pump 46 is not limited, and may be arbitrary as long as the heat medium can be made to flow thereby. Moreover, the first pump 46 may be disposed not on a downstream side of the first heat exchanger 18 but on an upstream side thereof. The first pump 46 is driven by a control device 48a to be described later, and adjusts the flow rate of the heat medium to be subjected to the heat exchange in the first heat exchanger 18. The flow rate of the heat medium may be adjusted by using a pump (not shown) with a constant flow rate and using a flow rate adjustment valve (not shown) as well as adjusted by the first pump 46.

The heat medium stored in the heat medium tank 20 by the first pump 46 is maintained at a predetermined set heat storage temperature (first temperature) to be described later, whereby charge/discharge efficiency of the CAES power generation device 2 can be maintained high. As a specific cause of a decrease of the charge/discharge efficiency, when an amount of the power absorbed by the compressor 10 is changed, an amount of heat of the compressed air discharged from the compressor 10 is changed. For example, when a discharge pressure and a discharge temperature are made constant, and the amount of power absorbed by the compressor 10 is increased, then a flow rate of the compressed air thus discharged is increased. Hence, when the flow rate of the heat medium that exchanges heat in the first heat exchanger 18 is made constant, a temperature of the heat medium flowing into the heat medium tank 20 rises. In this case, the temperature of the heat medium becomes a temperature higher than the set heat storage temperature to be described later, and the charge/discharge efficiency is decreased. Meanwhile, when the amount of power absorbed by the compressor 10 is reduced, the temperature of the heat medium falls below the set heat storage temperature, and the charge/discharge efficiency is also decreased in this case. In order to prevent this, the first pump 46 is controlled to adjust the flow rate of the heat medium, whereby the charge/discharge efficiency is maintained high. A specific control of the first pump 46 will be described later.

The heat medium tank 20 is a steel tank whose periphery is covered with a heat insulating material insulated from the atmosphere. In the heat medium tank 20, the heat medium whose temperature has risen by the first heat exchanger 18 is stored. In the heat medium tank 20, a remaining amount sensor 50a is installed, and the amount of heat medium stored therein can be detected. For example, the remaining amount sensor 50a may be a liquid level sensor. Moreover, the remaining amount sensor is not directly installed in the heat medium tank 20, but a flow rate sensor that detects a flow rate of the heat medium in the heat medium pipe may be provided, and the amount of heat medium in the heat medium tank 20 may be determined from an integrated value of an inflow and outflow of the heat medium. A temperature sensor 44b is further provided in the heat medium tank 20, whereby the temperature of the heat medium in the inside of the heat medium tank 20 can be measured. The heat medium stored in the heat medium tank 20 is supplied to the second heat exchanger 22 through the heat medium pipe 24.

In the heat medium pipe 24 from the heat medium tank 20 to the second heat exchanger 22, a second pump (second flow rate adjusting means) 52 for making the heat medium flow is provided. A type of the second pump 52 is not limited, and may be arbitrary. Moreover, the second pump 52 may be disposed not on an upstream side of the second heat exchanger 22 but on a downstream side thereof. The second pump 52 is driven by a control device 48b to be described later, and adjusts the flow rate of the heat medium to be subjected to the heat exchange in the second heat exchanger 22. The flow rate of the heat medium may be adjusted by using a pump with a constant flow rate and a flow rate adjustment valve as well as adjusted by the second pump 52.

By the second flow rate adjusting means, in addition to the set heat storage temperature on such a power absorption side, the expander can generate power at a set power generation temperature (second temperature) to be described later also on such a power generation side, and accordingly, the charge/discharge efficiency can be further enhanced.

The second heat exchanger 22 is provided in the air pipe 16 between the accumulator tank 12 and the expander 14. Hence, the heat exchange is performed between the compressed air supplied from the accumulator tank 12 to the expander 14 and the heat medium in the heat medium pipe 24, and the compressed air is heated before the expansion by the expander 14. That is, in the second heat exchanger 22, the temperature of the compressed air rises, and the temperature of the heat medium falls. A temperature sensor 44c for measuring the temperature of the compressed air in the inside of the air pipe is provided in the air pipe extending from the second heat exchanger 22 to the suction port 14a of the expander 14. Moreover, the heat medium whose temperature has fallen by the second heat exchanger 22 is supplied to the heat medium return tank 42 through the heat medium pipe 24.

The heat medium return tank 42 stores the heat medium whose temperature has fallen by performing the heat exchange in the second heat exchanger 22. Hence, the heat medium in the heat medium return tank 42 is usually lower in temperature than the heat medium in the heat medium tank 20. In a similar way to the heat medium tank 20, in the heat medium return tank 42, a remaining amount sensor 50b and a temperature sensor 44d are provided. The heat medium stored in the heat medium return tank 42 is supplied to the first heat exchanger 18 through the heat medium pipe 24.

A heat medium cooler 54 is provided in the heat medium pipe 24 extending from the heat medium return tank 42 to the first heat exchanger 18. The heat medium cooler 54 of this embodiment is a heat exchanger, and performs the heat exchange between a coolant and the heat medium in the heat medium pipe 24 extending from the heat medium return tank 42 to the first heat exchanger 18, and thereby lowers a temperature of the heat medium.

In this way, the temperature of the heat medium flowing into the first heat exchanger 18 can be maintained at a predetermined temperature (third temperature) by the heat medium cooler 54, and accordingly, the heat exchange in the first heat exchanger 18 can be performed stably, and the charge/discharge efficiency can be enhanced.

As described above, the heat medium path of the CAES power generation device 2 is configured.

Moreover, the CAES power generation device 2 includes the control devices 48a and 48b. The control devices 48a and 48b are constructed of hardware including a sequencer and the like, and of software implemented therein. The control device 48a is electrically connected to at least the motor 30, the first pump 46, and the power plant 6 (sees the alternate long and short dashed line in FIG. 1). The control device 48b is electrically connected to at least the generator 28, the second pump 52, and the power system 4 (see the alternate long and short dashed line in FIG. 1). Hence, operations of these are controlled by the control devices 48a and 48b. The pressure sensor 13, the temperature sensors 44a to 44d and the remaining amount sensors 50a and 50b output measured values thereof to the control devices 48a and 48b. The control devices 48a and 48b control the CAES power generation device 2 based on the measured values of these. In this embodiment, the control devices 48a and 48b are provided separately as the control device 48a that controls functions related to the compression and as the control device 48b that controls functions related to the expansion; however, a single control device that controls both of the functions may be provided.

For the first pump 46 and the second pump 52, the control devices 48a and 48b perform three types of control methods. Any of the following three types of control methods may be used.

First, based on the measured values of the temperature sensors 44a and 44c, the control devices 48a and 48b control the first pump 46 and the second pump 52 so as to constantly maintain each of a temperature Tot of the heat medium flowing out from the first heat exchanger 18 and a temperature Tes of the compressed air supplied to the expander 14. In this case, the first flow rate adjusting means of the present invention includes the first pump 46 and the temperature sensor 44a, and the second flow rate adjusting means of the present invention includes the second pump 52 and the temperature sensor 44c.

Specifically, when such a heat medium temperature Tot measured by the temperature sensor 44a is higher than the set heat storage temperature, the control device 48a increases a rotation speed of the first pump 46, increases the flow rate of the heat medium supplied to the first heat exchanger 18, and decreases the heat medium temperature Tot. Moreover, when such a compressed air temperature Tes measured by the temperature sensor 44c is higher than the set power generation temperature, the control device 48b reduces a rotation speed of the second pump 52, reduces the flow rate of the heat medium supplied to the second heat exchanger 22, and decreases the compressed air temperature Tes. When the heat medium temperature Tot is lower than the set heat storage temperature, and when the compressed air temperature Tes is lower than the set power generation temperature, operations reverse to those described above are performed. As described above, the set heat storage temperature and the set power generation temperature are maintained.

The set heat storage temperature is a target temperature of the temperature Tot of the heat medium flowing out from the first heat exchanger 18, and at this time, the charge/discharge efficiency of the whole of the system can be maximized. Moreover, the set power generation temperature is a target temperature of the temperature Tes of the compressed air supplied to the expander 14, and at this time, the charge/discharge efficiency of the whole of the system can be maximized.

Second, based on rotation speeds of the motor 30 and the generator 28, the control devices 48a and 48b control the first pump 46 and the second pump 52 so as to constantly maintain each of the temperature Tot of the heat medium flowing out from the first heat exchanger 18 and the temperature Tes of the compressed air supplied to the expander 14. In this case, the first flow rate adjusting means of the present invention includes the first pump 46, and the second flow rate adjusting means of the present invention includes the second pump 52.

Specifically, when the rotation speed of the motor 30 is increased more than a predetermined value, then an amount of the compressed air discharged from the compressor 10 is increased, and the temperature Tot of the heat medium flowing out from the first heat exchanger 18 rises. Hence, the control device 48a increases the rotation speed of the first pump 46, increases the flow rate of the heat medium supplied to the first heat exchanger 18, and decreases the heat medium temperature Tot. Moreover, when the rotation speed of the generator 28 is increased more than a predetermined value, then an amount of the compressed air for use in the expander 14 is increased, and the temperature Tes of the compressed air supplied to the expander 14 falls. Hence, the control device 48b increases the rotation speed of the second pump 52, increases the flow rate of the heat medium supplied to the second heat exchanger 22, and increases the compressed air temperature Tes. When the rotation speed of the motor 30 and the rotation speed of the generator 28 are decreased from the predetermined values, operations reverse to those described above are performed. As described above, the set heat storage temperature and the set power generation temperature are maintained. In this case, the first pump 46 and the second pump 52 are controlled by estimating the heat medium temperature Tot and the compressed air temperature Tes from the rotation speeds of the motor 30 and the generator 28, and accordingly, the temperature sensors 44a and 44c are unnecessary. However, the first and second control methods may be used in combination by installing the temperature sensors 44a and 44c.

Third, based on an absorbed power command value Lc and a generated power command value Lg, the control devices 48a and 48b control the first pump 46 and the second pump 52 so as to constantly maintain each of the temperature Tot of the heat medium flowing out from the first heat exchanger 18 and the temperature Tes of the compressed air supplied to the expander 14. In this case, the first flow rate adjusting means of the present invention includes the first pump 46, and the second flow rate adjusting means of the present invention includes the second pump 52.

The absorbed power command value Lc is an amount of power to be driven (absorbed) by the motor 30, and is determined based on an amount of charge, which is required from the power plant 6. The generated power command value Lg is an amount of power to be generated by the generator 28, and is determined based on an amount of generated power (demand power), which is required from the power system 4 as the demand destination. These may be determined based on a predicted value of the input power or on a predicted value of the demand power. These predicted values may be determined based on statistical data such as weather and weather conditions of that day, past weather conditions, and a temporal fluctuation of the demand power. Moreover, in order to suppress a power fluctuation at a system connecting point, these predicted values may be determined based on a change of the amount of power such as a voltage, a current and a frequency at the system connecting point so as to cancel that change.

Specifically, the control device 48a receives the absorbed power command value Lc and generates a rotation speed command for the compressor 10. This rotational speed command can be arithmetically operated based on an internal discharge pressure of the compressor 10, a discharge pressure, a suction temperature, a discharge temperature and the like at a discharge port thereof. In this arithmetic operation, a conversion table arithmetically operated in advance may be used, or the arithmetic operation may be performed in an inside of the control device 48a. The control device 48b receives the generated power command value Lg, and generates a rotation speed command for the expander 14. This rotation speed command can be arithmetically operated based on an internal discharge pressure of the expander 14, a discharge pressure, a suction temperature, a discharge temperature and the like at a discharge port thereof. In this arithmetic operation, a conversion table arithmetically operated in advance may be used, or the arithmetic operation may be performed in an inside of the control device 48b. The rotation speeds of the motor 30 and the generator 28 are determined based on these command values Lc and Lg, and the first pump 46 and the second pump 52 are controlled based on these rotation speeds in a similar way to the second control method.

By the absorbed power command value Lc, the heat medium can be stored in the heat medium tank 20 at a constant set heat storage temperature set so that the charge/discharge efficiency of the whole of the system can be maximized, and accordingly, the charge/discharge efficiency of the whole of the system can be enhanced. Moreover, there is a considerable time delay until a change appears in the temperature of the heat medium flowing out from the first heat exchanger 18; however, the flow rate of the heat medium is controlled in response to the change of the amount of power to be absorbed by the compressor 10, whereby an appropriate flow rate of the heat medium can be set before the change appears in the temperature of the heat medium, and the charge/discharge efficiency can be further enhanced.

By the generated power command value Lg, the compressed air can be supplied to the expander 14 at a constant set power generation temperature set so that the charge/discharge efficiency of the whole of the system can be maximized, and accordingly, the charge/discharge efficiency of the whole of the system can be enhanced. Moreover, there is a considerable time delay until a change appears in the temperature of the compressed air to be supplied to the expander 14; however, the flow rate of the heat medium is controlled in response to the change of the amount of power to be generated by the generator 28, whereby an appropriate flow rate of the heat medium can be set before the change appears in the temperature of the compressed air, and the charge/discharge efficiency can be further enhanced.

Here, the set heat storage temperature (first temperature) is a temperature of the heat medium, which is suitable for such a storage operation in the heat medium tank 20, and is set to 170° C. in the first embodiment mentioned above. Meanwhile, the set power generation temperature (second temperature) is a temperature of the compressed air, which is suitable for such power generation by the expander 14, and is set to 170° C. in the first embodiment mentioned above. These temperatures may be fixed values, or may be variable values which vary in response to other conditions.

Figure 2:
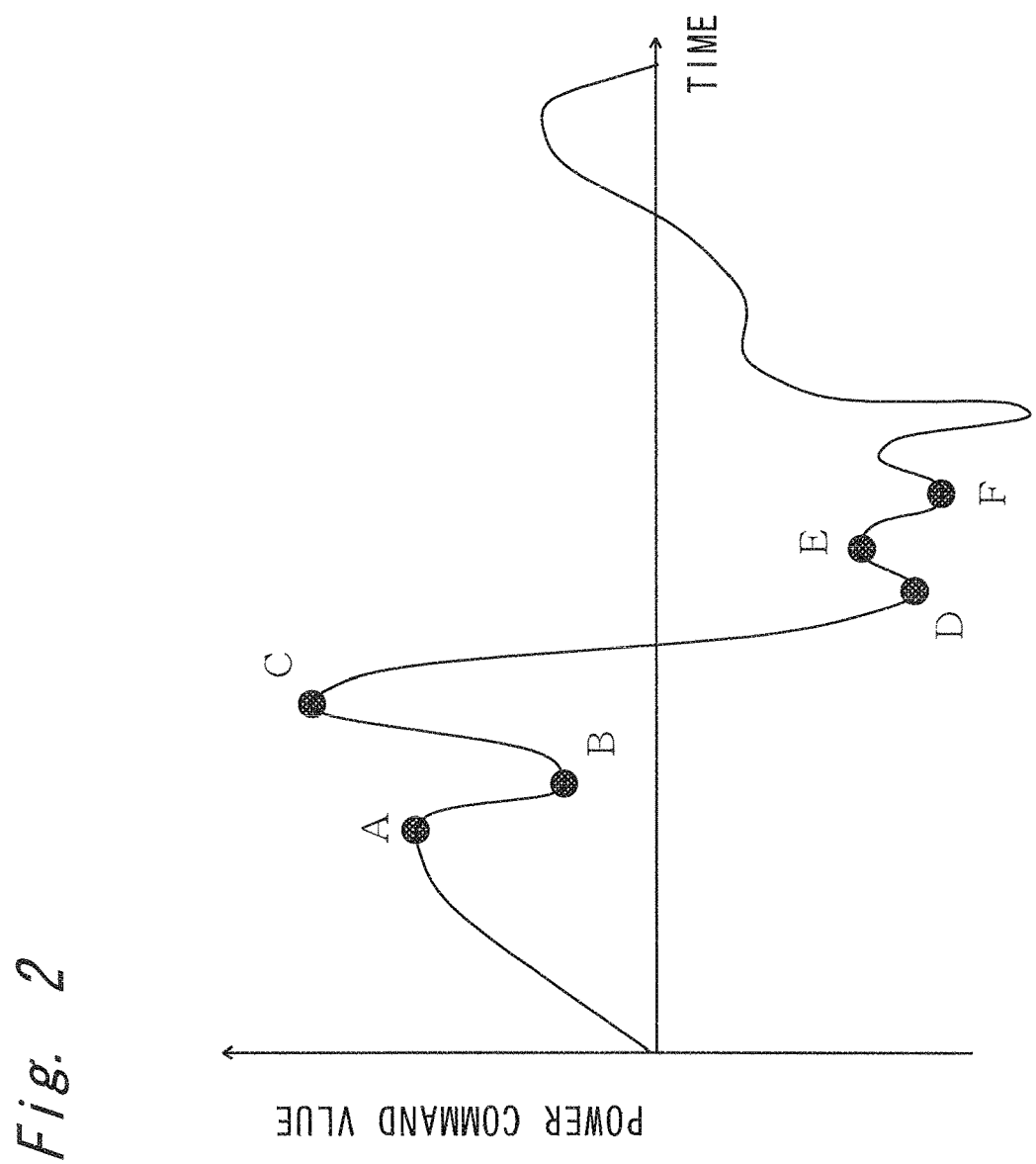
FIG. 2 is a graph showing an example of a charge command and a discharge command.

FIG. 2 is a graph showing an example of a charge command and a discharge command. An axis of abscissas represents time, and an axis of ordinates represents the absorbed power command value or the generated power command value. A positive side indicates the charge command, and a negative side indicates the discharge command. In the case of using the screw-type compressor 10 and the screw-type expander 14, the amount of power to be absorbed (charged) or generated (discharged) and the rotation speeds of the motor 30 of the compressor 10 and the generator 28 of the expander 14 are changed substantially in proportion to each other. Moreover, in a similar way, the amount of compressed air to be discharged from the compressor 10 and the amount of compressed air for use in the expander 14 are also changed substantially in proportion to the rotation speeds. Hence, the axis of ordinates of the graph also corresponds to these rotation speeds or the amount of compressed air.

Referring to FIG. 2, a description will be made of a specific example of a control for the fluctuation of the power to be absorbed or generated with time. As the power fluctuates as shown in FIG. 2, the rotation speeds of the motor 30 (compressor 10) and the generator 28 (expander 14) are changed. As mentioned above, by the fact that the rotation speeds are thus changed, the temperature of the heat medium subjected to the heat exchange by the first heat exchanger 18 and the second heat exchanger 22 is also changed. Hence, the control devices 48a and 48b adjust the flow rate of the heat medium by the first pump 46 and the second pump 52 to adjust the temperature of the heat medium, and maintain the heat medium, which is stored in the heat medium tank 20, at an optimum set heat storage temperature, and maintain the compressed air, which is supplied to the expander 14, at an optimum set power generation temperature, thereby maintaining the efficiency of the system.

In State A, with regard to the air temperature, for example, an intake air temperature Tcs of the compressor 10 is established as Tcs=20° C. (normal temperature), a temperature Tcd of the compressed air discharged from the compressor 10 is established as Tcd=180° C., and a temperature Tti of the compressed air supplied to the accumulator tank 12 is established as Tti=50° C. With regard to the heat medium temperature of State A, for example, a temperature Toc of the heat medium flowing into the first heat exchanger 18 is established as Toc=40° C., and a temperature Tot of the heat medium flowing out from the first heat exchanger 18 is established as Tot=170° C. Hence, the heat medium at 170° C. is supplied to the heat medium tank 20. The respective temperatures of State A are summarized as shown in the following Table 1.

TABLE 1

|  | State A | | | | |
|---|---|---|---|---|---|
|  | Tcs | Tcd | Tti | Toc | Tot |
| Temperature (° C.) | 20 | 180 | 50 | 40 | 170 |

When the absorbed power command value Lc decreases as in State B after changing from State A, the rotation speed of the compressor 10 decreases, and accordingly, if it is assumed that the amount of air discharged from the compressor 10 decreases, and the flow rate of the heat medium is not controlled at all, then the amount of heat exchange decreases by that amount. Hence, the temperature Tot of the heat medium flowing out from the first heat exchanger 18 falls. In State B, for example, the temperature Tot of the heat medium flowing out from the first heat exchanger 18 is approximately 110° C.

When the heat medium having Tot=110° C. is mixed with the heat medium stored at 170° C. in the heat medium tank 20, the temperature of the heat medium in the heat medium tank 20 falls, for example, to approximately 130° C. When the compressed air is heated in the second heat exchanger 22 at this temperature, the power generation efficiency decreases. Hence, it is necessary to maintain the temperature Tot of the heat medium, which flows out from the first heat exchanger 18, constantly as Tot=170° C. For this purpose, it is sufficient if the flow rate of the heat medium supplied to the first heat exchanger 18 is reduced. Hence, the control device 48a reduces the flow rate of the heat medium supplied to the first heat exchanger 18 by the first pump 46, and maintains the temperature of the heat medium, which flows out from the first heat exchanger 18, constantly as Tot=170° C.

Subsequently, when the absorbed power command value Lc changes from State B to State C, it is necessary to increase the rotation speed of the compressor 10 more than in State A. Hence, the amount of compressed air supplied to the first heat exchanger 18 is increased more than in State A, and the amount of heat recovered into the heat medium in the first heat exchanger 18 is increased. In State C, for example, the temperature Tot of the heat medium flowing out from the first heat exchanger 18 is approximately 190° C.

When the temperature Tot of the heat medium flowing out from the first heat exchanger 18 rises from 170° C. as in State C, the control device 48a increases the rotation speed of the first pump 46 to increase a circulation flow rate of the heat medium, and maintains the temperature of the heat medium, which flows out from the first heat exchanger 18, constantly as Tot=170° C. As described above, in such a charging process, the temperature Tot of the heat medium flowing out from the first heat exchanger 18 is maintained constantly at 170° C., and the set heat storage temperature set so as to be capable of maximizing the charge/discharge efficiency of the whole of the system is realized.

Furthermore, when the command is switched from the charge command to the discharge command, and the state is shifted to State D, operations of such instruments related to the charge are stopped, or the instruments are operated by an amount of minute fluctuation removal, and operations of such instruments related to the discharge are started.

In State D, with regard to the air temperature, for example, a temperature Tto of the compressed air discharged from the accumulator tank 12 is established as Tto=50, a temperature Tes of the compressed air supplied to the expander 14 is established as Tes=160° C., and a temperature Ted of the air discharged from the expander 14 is established as Ted=50. Here, it is assumed that the compressed air discharged from the accumulator tank 12 is not left for a long time, and that the temperature Tto of the compressed air in the accumulator tank 12 does not fall. With regard to the heat medium temperature of State D, for example, a temperature Toe of the heat medium flowing into the second heat exchanger 22 is established as Toe=170° C., and a temperature Tori of the heat medium flowing out from the second heat exchanger 22 is established as Tori=60° C. Hence, the heat medium at 60° C. is supplied to the heat medium return tank 42. Thereafter, when the heat medium is supplied from the heat medium return tank 42 to the first heat exchanger 18, the heat medium is cooled to approximately 40° C. by the heat medium cooler 54. The respective temperatures of State D are summarized as shown in the following Table 2.

TABLE 2

|  | State D | | | | |
|---|---|---|---|---|---|
|  | Tto | Tes | Ted | Toe | Tori |
| Temperature (° C.) | 50 | 160 | 50 | 170 | 60 |

When the generated power command value Lg changes as in State E after changing from State D, the rotation speed of the expander 14 decreases, and accordingly, a consumption of the compressed air from the accumulator tank 12 decreases, and by that amount, the flow rate of the compressed air supplied to the second heat exchanger 22 decreases. Hence, if it is assumed that the flow rate of the heat medium is not controlled at all, then the temperature Tes of the compressed air supplied to the expander 14 rises. In State E, for example, the temperature Tes of the compressed air supplied to the expander 14 is approximately 180° C.

In order to maintain power generation efficiency in State E, it is necessary to constantly maintain the temperature Tes of the compressed air supplied to the expander 14. For this purpose, it is sufficient if the flow rate of the heat medium supplied to the second heat exchanger 22 is reduced. Hence, the control device 48b reduces the rotation speed of the second pump 52 to reduce the flow rate of the heat medium supplied to the second heat exchanger 22, and constantly maintains the temperature Tes of the compressed air supplied to the expander 14 as Tes=160° C.

Subsequently, when the generated power command value Lg changes from State E to State F, the rotation speed of the expander 14 increases, and accordingly, the consumption of the compressed air from the accumulator tank 12 increases, and by that amount, the flow rate of the compressed air supplied to the second heat exchanger 22 increases. Hence, the temperature Tes of the compressed air supplied to the expander 14 falls. In State F, for example, the temperature Tes of the compressed air supplied to the expander 14 is approximately 130° C.

In order to maintain power generation efficiency in State F, it is necessary to constantly maintain the temperature Tes of the compressed air supplied to the expander 14. For this purpose, it is sufficient if the flow rate of the heat medium supplied to the second heat exchanger 22 is increased. Hence, the control device 48b increases the rotation speed of the second pump 52 to increase the circulation flow rate of the heat medium, and constantly maintains the temperature Tes of the compressed air supplied to the expander 14. As described above, in such a discharging process, the temperature Tes of the compressed air supplied to the expander 14 is maintained constantly at 160° C., and the set power generation temperature set so as to be capable of maximizing the charge/discharge efficiency of the whole of the system is realized.

As described above, the optimum set heat storage temperature and set power generation temperature are maintained, whereby the charge/discharge efficiency of the whole of the system can be maximized.

Moreover, the CAES power generation device 2 of this embodiment also performs control corresponding to a storage amount of the heat medium in the heat medium tank 20. For example, when it is detected by the remaining amount sensor 50b that the storage amount of the heat medium in the heat medium tank 20 has reached 90% of a full capacity of the heat medium tank 20, then the heat cannot be stored any more if 10% as the rest is further stored. In this case, the heat medium to be stored in the heat medium tank 20 may be introduced into a reserve tank (not shown) for releasing the heat medium, the reserve tank not being insulated. In place of this, the heat medium is cooled by using the heat medium cooler 54 and the like, and the discharge is performed by means of constant power even if the discharge command is not received, whereby the heat medium in the heat medium tank 20 may be used. Alternatively, the compressed air is stored in the accumulator tank 12 without performing the heat exchange therefor in the first heat exchanger 18, or is released to the atmosphere, whereby the heat medium may not be allowed to be supplied to the heat medium tank 20. All of the cases are not preferable since the amount of heat to be recovered is wasted or the charge/discharge efficiency decreases to a large extent; however, such a case can be avoided where the heat medium tank 20 becomes full and becomes incapable of storing heat any more.

Moreover, for example, when the storage amount of the heat medium in the heat medium tank 20 has reached 90% of the full capacity of the heat medium tank 20, it is preferable to adjust the first pump 46 to decrease the amount of the circulating heat medium and raise Tot from 170° C. to approximately 230° C. so as not to allow the large decrease of the charge/discharge efficiency. Here, third flow rate adjusting means of the present invention is used for executing this temperature adjustment. The third flow rate adjusting means of the present invention includes at least the first pump 46 and the remaining amount sensor 50a. For the adjustment of the amount of the heat medium, in place of the above, a third pump (not shown) may be newly provided in addition to the use of the first pump 46. Alternatively, a heat medium tank (not shown) for high temperature may be provided separately to store therein only the heat medium heated to 230° C.

In this way, the charge/discharge efficiency falls by a considerable amount; however, a large decrease of the efficiency, which is caused by a heat loss, is avoided. Furthermore, in the second heat exchanger 22, a larger amount of the generated power can be outputted when the heat exchange is performed by the heat medium at 230° C. to allow the generator 28 to perform the power generation than when the heat exchange is performed by the heat medium at 170° C. to allow the generator 28 to perform the power generation. Moreover, the temperature of the heat medium flowing into the heat medium tank 20 is raised more than a set heat storage temperature in a predetermined steady state, and the flow rate of the heat medium flowing into the heat medium tank 20 is reduced, whereby a time until the heat medium tank 20 becomes full can be extended. Moreover, the temperature of the heat medium of the heat medium tank 20 can be raised, and accordingly, the heat can be stored even under such circumstances where it becomes originally impossible to store the heat though the charge/discharge efficiency as a whole decreases, and therefore, at least the charge efficiency can be enhanced. Hence, it is effective to raise the temperature of the heat medium and to lower such a circulated amount of the heat medium.

Moreover, when the temperature of the heat medium stored in the heat medium tank 20 falls, the heat medium may be heated up to a predetermined temperature by a heater (not shown) or the like. When the amount of the heat medium stored in the heat medium tank 20 decreases, the heat medium stored in the heat medium return tank 42 may be heated by the heater or the like after being supplied to the heat medium tank 20.

Second Embodiment

Figure 3:
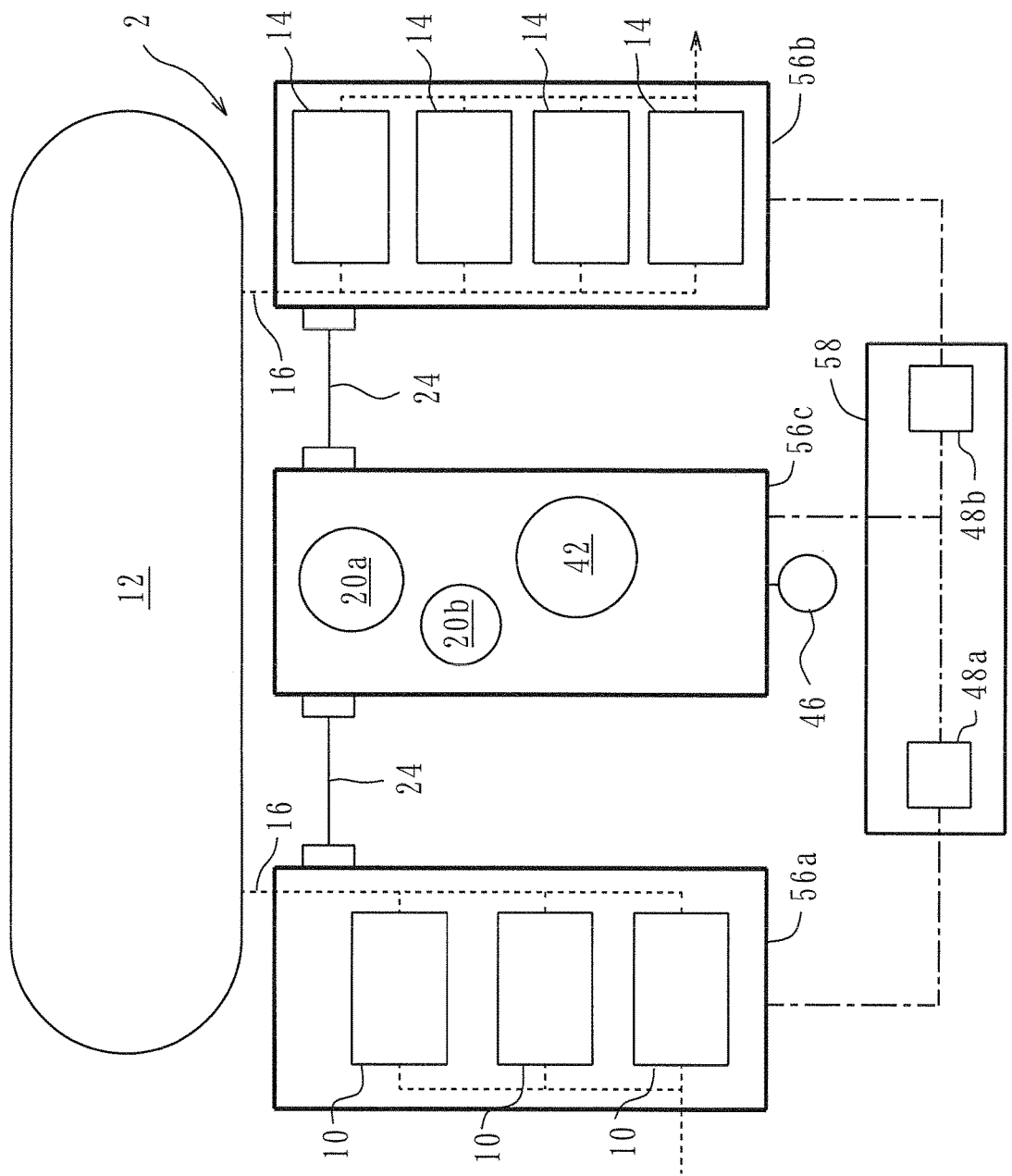
FIG. 3 is a schematic diagram of a compressed air energy storage (CAES) power generation device according to a second embodiment of the present invention.

FIG. 3 shows a schematic diagram of the CAES power generation device 2 of a second embodiment. The CAES power generation device 2 of this embodiment is substantially similar to that of the first embodiment in FIG. 1 except that pluralities of the compressors 10, the expanders 14 and heat medium tanks 20a and 20b are installed, and that such constituents are housed in containers 56a to 56c. Hence, a description of portions similar to those shown in FIG. 1 will be omitted. Moreover, since FIG. 3 is a schematic diagram, not all constituents of the CAES power generation device 2 are illustrated.

Referring to FIG. 3, the CAES power generation device 2 of this embodiment includes three compressors 10 and four expanders 14. The three compressors 10 are fluidly connected in parallel to one another, and the four expanders 14 are also fluidly connected in parallel to one another. The number of compressors 10 and the number of expanders 14, which are to be driven, can be changed in response to the input power and the demand power, and accordingly, it is possible to perform wide and efficient smoothing. Moreover, the compressors 10, the expanders 14 and the accumulator tank 12 are coupled to one another by the air pipe 16, and the compressors 10, the expanders 14, the heat medium tanks 20a and 20b and the heat medium return tank 42 are coupled to one another by a heat medium pipe 24. Both of the control devices 48a and 48b are collectively housed in a house 58.

The CAES power generation device 2 of this embodiment includes a high-temperature heat medium tank 20a and a low-temperature heat medium tank 20b, and the heat medium subjected to the heat exchange in the first heat exchanger 18 is stored separately for each temperature. Hence, in the second heat exchanger 22, the heat exchange is performed at heat medium temperatures corresponding to necessity, and accordingly, the discharge efficiency is enhanced.

In this embodiment, most of the constituents of the CAES power generation device 2 are housed in the containers 56a to 56c. In particular, three containers 56a to 56c are installed while being divided as the container 56a related to such a compression function including the compressors 10 and the first heat exchanger 18 and the like (not shown), the container 56b related to such an expansion function including the expanders 14 and the second heat exchangers 22 and the like (not shown), and the container 56c related to such a heat storage function including the heat medium tank 20 and the like. The constituents are housed in the containers 56a to 56c, whereby an installation cost in the case of installing the CAES power generation device 2 can be suppressed to a large extent. In the case of this embodiment, the heat medium cooler 54 is disposed as a cooling tower on an outside of the container 56c.

Moreover, in the example of FIG. 3, each of such a charge side and such a discharge side is given a capacity of approximately 500 kW. A charge/discharge unit is composed of the containers 56a to 56c, whereby it becomes easy to transport and install the charge/discharge unit, and a facility capacity can be freely increased and decreased. For example, if six sets, each of which includes these three containers 56a to 56c, are installed, then a facility with 3 MW as a whole can be constructed.

Throughout the first and second embodiments, "fluctuating input power" of the present invention is not limited to renewable energy, but may be one that smoothes demand power of a factory facility or performs a peak cut therefor.

The invention claimed is:

1. A compressed air energy storage and power generation device comprising:
   an electric motor driven by fluctuating input power;
   a compressor that is mechanically connected to the electric motor and compresses air;
   an accumulator tank that is fluidly connected to the compressor and stores the air compressed by the compressor;
   an expander that is fluidly connected to the accumulator tank and is driven by the compressed air supplied from the accumulator tank;
   a generator that is mechanically connected to the expander and generates power;
   a first heat exchanger for heating a heat medium by performing heat exchange between the heat medium and the air compressed by the compressor;
   a heat medium tank that is fluidly connected to the first heat exchanger and stores the heat medium;
   a second heat exchanger that is fluidly connected to the heat medium tank and serves for heating the compressed air by performing heat exchange between the heat medium supplied from the heat medium tank and the compressed air supplied to the expander;
   a first flow rate adjuster comprising a first pump for adjusting an amount of the heat medium supplied to the first heat exchanger; and
   a controller configured to adjust the amount of the heat medium supplied to the first heat exchanger by the first flow rate adjuster so as to maintain the heat medium stored in the heat medium tank at a predetermined first temperature,
   wherein the heat medium tank further includes a remaining amount sensor for measuring an amount of the stored heat medium; and
   when a measured value of the remaining amount sensor tells that an amount of the heat medium storable in the heat medium tank has become a predetermined value or less, the controller is configured to raise a temperature of the stored heat medium by reducing the amount of heat medium which is supplied to the first heat exchanger by the first pump.

2. The compressed air energy storage and power generation device according to claim 1, wherein, so as to maintain the heat medium stored in the heat medium tank at the predetermined first temperature, the controller is configured to control a flow rate of the heat medium, which flows into the first heat exchanger, by the first flow rate adjuster based on a change of an amount of power to be driven by the electric motor.

3. The compressed air energy storage and power generation device according to claim 2, further comprising a second flow rate adjuster comprising a second pump for adjusting an amount of the heat medium supplied to the second heat exchanger.

4. The compressed air energy storage and power generation device according to claim 3, wherein, so as to maintain the compressed air supplied to the expander at a predetermined second temperature, the controller is configured to adjust the amount of the heat medium, which is supplied to the second heat exchanger, by the second flow rate adjuster.

5. The compressed air energy storage and power generation device according to claim 4, wherein, so as to maintain the compressed air flowing into the expander at the predetermined second temperature, the controller is configured to control a flow rate of the heat medium, which flows into the second heat exchanger, by the second flow rate adjuster based on a change of the amount of power to be generated by the generator.

6. The compressed air energy storage and power generation device according to claim 2, further comprising:
   a heat medium return tank that is fluidly connected to the first heat exchanger and the second heat exchanger and stores the heat medium whose temperature has fallen by the second heat exchanger; and
   a heat medium cooler for lowering a temperature of the heat medium, which is supplied from the heat medium return tank to the first heat exchanger, to a predetermined third temperature.

7. The compressed air energy storage and power generation device according to claim 1, further comprising a second flow rate adjuster comprising a second pump for adjusting an amount of the heat medium supplied to the second heat exchanger.

8. The compressed air energy storage and power generation device according to claim 7, wherein, so as to maintain the compressed air supplied to the expander at a predetermined second temperature, the controller is configured to adjust the amount of the heat medium, which is supplied to the second heat exchanger, by the second flow rate adjuster.

9. The compressed air energy storage and power generation device according to claim 8, wherein, so as to maintain the compressed air flowing into the expander at the predetermined second temperature, the controller is configured to control a flow rate of the heat medium, which flows into the second heat exchanger, by the second flow rate adjuster based on a change of the amount of power to be generated by the generator.

10. The compressed air energy storage and power generation device according to claim 1, further comprising:
   a heat medium return tank that is fluidly connected to the first heat exchanger and the second heat exchanger and stores the heat medium whose temperature has fallen by the second heat exchanger; and
   a heat medium cooler for lowering a temperature of the heat medium, which is supplied from the heat medium return tank to the first heat exchanger, to a predetermined third temperature.

11. A compressed air energy storage and power generation method comprising:
   driving an electric motor by fluctuating input power;
   compressing air by a compressor mechanically connected to the electric motor;
   storing the compressed air, which is supplied from the compressor, in an accumulator tank;
   driving an expander by the compressed air supplied from the accumulator tank;
   generating power by a generator mechanically connected to the expander;
   raising a temperature of a heat medium by performing heat exchange between the heat medium and the compressed air, which is compressed by the compressor, in a first heat exchanger;
   storing the heat medium, whose temperature has risen by the first heat exchanger, in a heat medium tank;
   raising a temperature of the compressed air, which is supplied from the accumulator tank, by performing heat exchange between the heat medium, which is supplied from the heat medium tank, and the compressed air in a second heat exchanger, and supplying the compressed air, whose temperature has risen, to the expander;
   adjusting an amount of the heat medium supplied to the first heat exchanger by a first flow rate adjuster comprising a first pump so as to maintain the heat medium, which is stored in the heat medium tank, at a predetermined first temperature;
   measuring an amount of the heat medium, which is stored in the heat medium tank, by a remaining amount sensor;
   supplying the heat medium to the heat medium tank such that an amount of the heat medium storable in the heat medium tank becomes a predetermined value or less, and
   when a measured value of the remaining amount sensor tells that the amount of the heat medium storable in the heat medium tank has become the predetermined value or less, raising a temperature of the stored heat medium by reducing the amount of heat medium which is supplied to the first heat exchanger by the first pump.

12. The compressed air energy storage and power generation method according to claim 11, wherein, so as to maintain the heat medium stored in the heat medium tank at the predetermined first temperature, adjusting a flow rate of the heat medium flowing into the first heat exchanger by the first flow rate adjuster based on a change of an amount of power to be driven by the electric motor.

13. The compressed air energy storage and power generation method according to claim 12, wherein, so as to maintain the compressed air flowing into the expander at a second temperature, adjusting a flow rate of the heat medium flowing into the second heat exchanger by a second flow rate adjuster comprising a second pump based on a change of the amount of power to be generated by the generator.

14. The compressed air energy storage and power generation method according to claim 11, wherein, so as to maintain the compressed air flowing into the expander at a second temperature, adjusting a flow rate of the heat medium flowing into the second heat exchanger by a second flow rate adjuster comprising a second pump based on a change of the amount of power to be generated by the generator.

* * * * *